(No Model.)  3 Sheets—Sheet 1.
W. I. ADAMS.
PHOTOGRAPHIC CAMERA.
No. 436,391.  Patented Sept. 16, 1890.
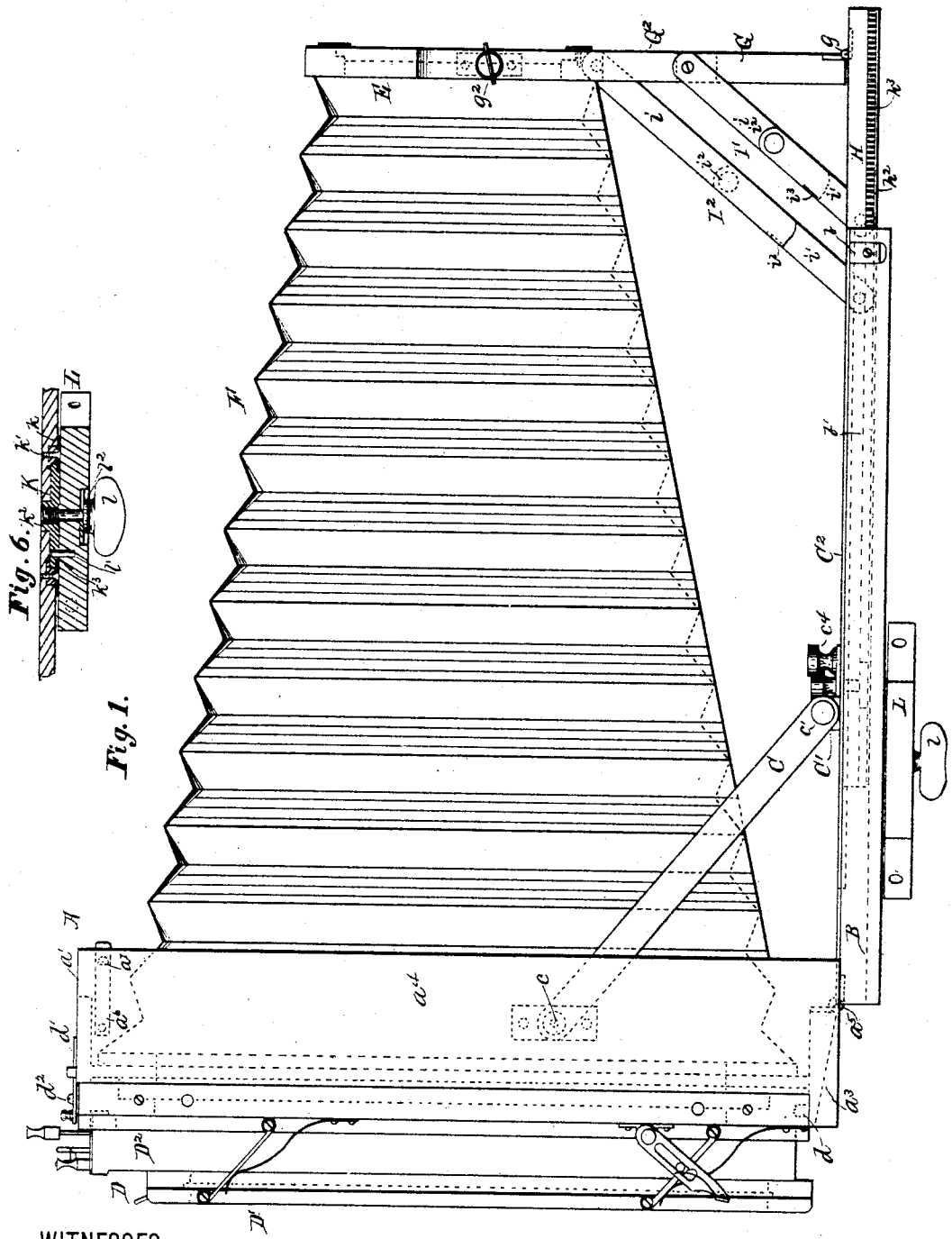
WITNESSES:
INVENTOR
Washington Irving Adams
BY
Gifford & Brown
HIS ATTORNEYS (No Model.)  3 Sheets—Sheet 2.
W. I. ADAMS.
PHOTOGRAPHIC CAMERA.
No. 436,391.  Patented Sept. 16, 1890.
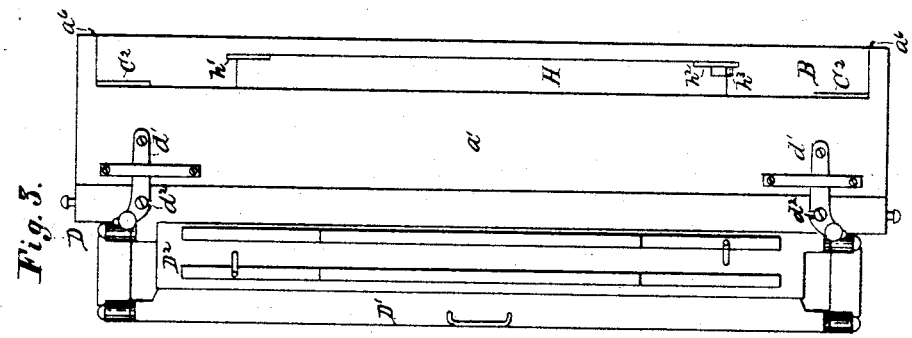
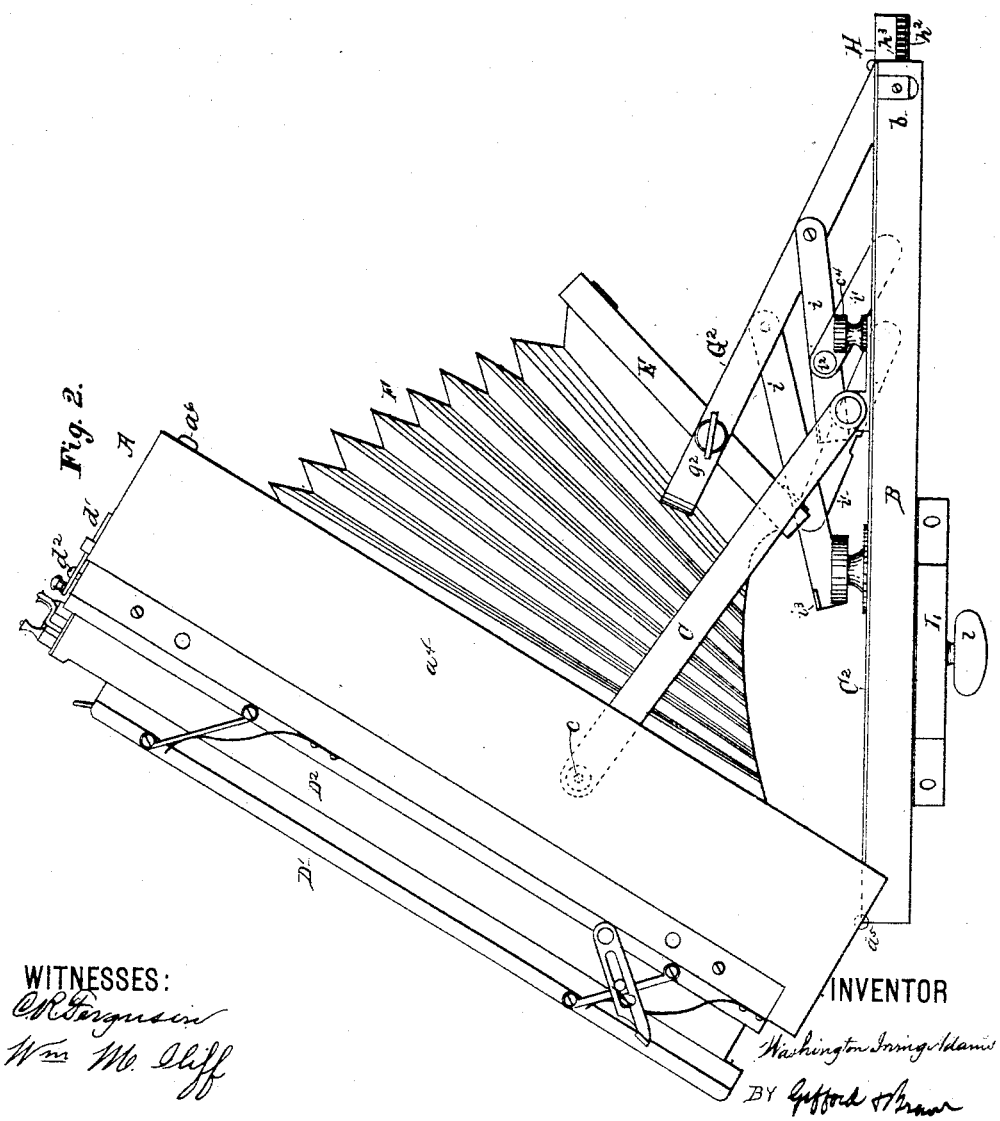
WITNESSES:
INVENTOR
Washington Irving Adams
BY Gifford & Brown
HIS ATTORNEYS

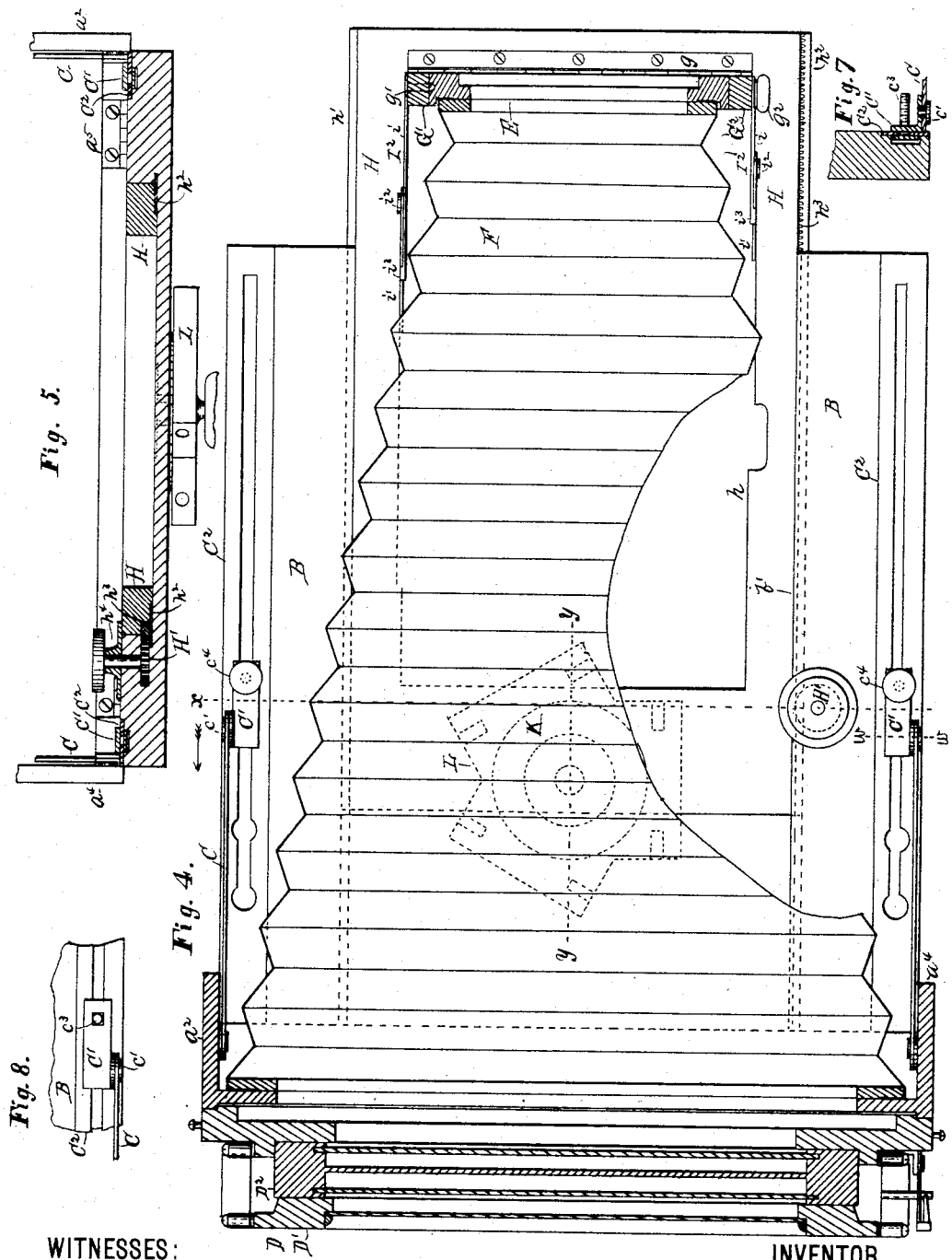

UNITED STATES PATENT OFFICE.

WASHINGTON IRVING ADAMS, OF MONTCLAIR, NEW JERSEY, ASSIGNOR TO THE SCOVILL & ADAMS COMPANY, OF NEW YORK, N. Y.

PHOTOGRAPHIC CAMERA.

SPECIFICATION forming part of Letters Patent No. 436,391, dated September 16, 1890.

Application filed January 10, 1890. Serial No. 336,570. (No model.)

*To all whom it may concern:*

Be it known that I, WASHINGTON IRVING ADAMS, of Montclair, in the county of Essex and State of New Jersey, have invented a certain new and useful Improvement in Photographic Cameras, of which the following is a specification.

I will now describe a photographic camera embodying my improvement, and then point out the novel features in the claims.

In the accompanying drawings, Figure 1 is a side view of a photographic camera embodying my improvement with its parts adjusted for use. Fig. 2 is a side view with parts adjusted for closing. Fig. 3 is a top view of the camera closed. Fig. 4 is a horizontal section with certain parts broken away. Fig. 5 is a transverse vertical section taken at the plane of the dotted line $x\ x$, Fig. 4, and looking in the direction indicated by the arrow at the end of the line. Fig. 6 is a vertical longitudinal section of the base portion of the camera, taken at the plane of the dotted line $y\ y$, Fig. 4. Fig. 7 is a vertical transverse section taken at the plane of the dotted line $w\ w$, Fig. 4. Fig. 8 is a top view of a slide, clamping-screw, and other parts.

Similar letters of reference designate corresponding parts in all the figures.

A designates the back frame of the camera-body. It is of rectangular form, and, as here shown, composed of four pieces of wood $a'\ a^2\ a^3\ a^4$, secured together at the ends in positions at right angles to each other. At the forward edge of its bottom piece $a^3$ it is connected by hinges $a^5$ with a base-board B, and may be held in an operative position at any desired angle with the base-board by means of brace-rods C, preferably of metal, pivotally connected by pins $c$ to the side pieces $a^2\ a^4$ of the back frame, and pivotally connected by pins $c'$ to slides C′, that are fitted to the base-board. The base-board is provided with grooves to receive the slides, and, as here shown, these grooves are smaller at the top than at the bottom. They may advantageously be made by grooving out the upper surface of the base-board and then securing above the grooved portions longitudinally-slotted plates $C^2$. The slides are made to engage with the edges of the slotted plates $C^2$, and are provided with clamping devices, whereby they may be secured in any position to said plates. The clamping devices, as shown, consist of screws $c^3$, bearing against the under sides of said plates and passing up through the slides and engaging with nuts $c^4$. These screws where they pass through the slides are made square or otherwise shaped to interlock with the slides, so that said screws will not turn when the nuts are rotated upon them, as may be seen by reference to Fig. 8. The nuts bear upon the upper sides of the slides. By loosening the nuts $c^4$ the slides may be moved along the slotted plates $C^2$ to permit of the adjustment of the back frame to the base-board. The side pieces $a^2\ a^4$ on the back frame extend forward of the top and bottom pieces thereof for a distance equal to the thickness of the base-board, and the base-board is made narrower than the back frame to the extent of the thickness of the side pieces of the back frame, the object being to enable the back frame to fold down over the base-board and receive the latter within it. When this is done, the back frame and base-board may be retained in the relative positions which they occupy by means of catches, here shown as consisting of strips of spring metal $a^6$, secured at their rear ends to the inner surfaces of the side pieces $a^2\ a^4$ of the back frame, and having near their forward ends and upon their inner sides pins or projections $a^7$, which will enter recesses $b$ in the side edges of the base-board. The strips of spring metal $a^6$ are made so long that their forward extremities will project beyond the base-board when the latter is received within the back frame, so that said strips may be reached to disengage them from the base-board.

D designates the camera-back. It is of ordinary construction, and hence requires no description further than that it is provided with a ground-glass frame D′, is adapted to receive a plate-holder $D^2$, engages at the bottom by means of pins $d$ with the rearwardly-projecting portion of the part $a^3$ of the back frame of the camera, and is connected at the top to the said frame by means of spring-actuated hooks $d'$ and pins $d^2$.

E designates the front frame of the camera. As here shown, it is connected with the back frame by a collapsible and expansible body F of bellows-like construction, and is pivoted at the sides to arms G' G². As here shown, the arms G' G² extend from a board G. The pivotal connection between them and the front frame E may be made in any desired way. As here shown, through the arm G' loosely extends an ordinary screw $g'$, which engages with the side of the front frame, and through the arm G² loosely extends a hand-screw $g^2$, which enters and engages with the adjacent side of the front frame. By turning the hand-screw it may be made to clamp the front frame to the arm G². It will be observed that the front frame is of substantially the same thickness as the arms G' G² and board G. It may therefore be folded into the same plane to occupy very little space. Obviously it may be adjusted at various angles relatively to the arms G' G² and board G.

The base-board B has in its upper side a recess $b'$. This recess extends from front to rear and almost entirely across from side to side. In it is fitted a slide H, here shown as made of pieces of board of a thickness corresponding to the depth of said recess and having secured to its bottom at the side edges plates or metal strips $h'$ $h^2$, that engage in grooves provided at the sides of the recess in the base-board. These plates may be secured to the slide by screws or otherwise. By engaging with the grooves of the base-board they prevent the slide from having any movement relatively to the base-board, except in the direction of the length of the base-board, or, in other words, from front to rear thereof. The plate $h^2$ is provided with a rack $h^3$, whose teeth extend from the side of the slide H above the plate proper. With this rack engages a pinion H', which is mounted on a shaft journaled in a stand or bearing $h^4$, fastened to the base-board, and has at the upper end a hand-piece whereby it may be rotated. By turning the hand-piece the pinion may be made to adjust the rack, and consequently the slide H, forward and backward. The board G is connected by a hinge $g$ with the slide H.

I' I² designate braces for supporting the board G and arms G' G² in their upright positions. The brace I' consists of a rod or plate $i$, pivotally connected to one side of the board G, and a rod or plate $i'$, pivotally connected to the slide H. These two rods or plates are pivotally connected to each other by a pin $i^2$, and the rod or plate $i$ is extended downward and rearward beyond the pin $i^2$, and provided with a lug $i^3$, which will bear against the edge of the rod or plate $i'$ to prevent the said rods $i$ $i'$ from being moved out of line in a forward direction, but without interfering with the deflection of these rods rearwardly to permit of swinging the board G and arms G' G² back rearwardly. The brace I² is of the same construction, and I have similarly lettered its parts. It will, however, be seen that it is longer, that its rod or plate $i$ is connected to the arm G' instead of to the board G, and that its rod or plate $i'$ is connected to the slide farther rearward than the corresponding rod or plate of the brace I'. Whenever it is desired to swing the board G and arms G' G² backward, the braces I' I² may be deflected by pressure against the forward edges opposite the pins connecting the component rods or plates.

The slide H is really made in the form of a frame, having a recess or opening $h$ inward of all its edges. This opening $h$ is of a width to receive within it the board G and arms G' G², as well as the front frame E, when the latter is swung into the same plane as said board G between the arms G' G². If the base-board and back frame are swung toward each other, the slide H is adjusted so that its forward end will be flush with the forward end of the base-board, and the front frame will be swung over, so that that edge which is uppermost when it is in use will be adjacent to that surface of the board G that extends between the arms G' G². All the parts may be very closely packed between the base-board and the back frame, and the base-board will be received within the side pieces $a^2$ $a^4$ of the back frame.

The base-board has secured to its under side a turn-table plate K, having a rabbet in the lower side near the edge which receives one edge of an annular plate $k$, that is fastened to the base-board by a screw $k'$. The turn-table plate is free to rotate within a cavity formed in the bottom of a base-board. At the center of the turn-table plate is a screw-threaded socket $k^2$, and around this are arranged holes $k^3$.

L designates the top of a tripod or support fitted with a hand-screw $l$ and provided on its upper surface with a pin $l'$. The pin $l'$ is so fastened that it may engage with any one of the holes $k^3$, and the screw is of such a size that it may engage with the screw-socket $k^2$. In this way the turn-table plate may be secured to the tripod or support in such manner as to leave the camera free to rotate. The screw has a shoulder $l^2$, which bears against the under side of the part L, so that by turning the screw properly the camera may be clamped to the part L and prevent it from turning.

What I claim as my invention, and desire to secure by Letters Patent, is—

1. The combination, with the base-board of a camera, a rabbeted turn-table plate K, having a central socket and a hole between the socket and the circumference, and the annular plate $k$, securing said turn-table plate in place, of the part L, screw $l$, and pin $l'$, substantially as specified.

2. In a camera, the combination of a front plate, arms between which the said front plate is pivoted, and braces I I', severally consisting of two rods or plates $i'$ $i^2$, pivoted together, substantially as specified.

3. In a camera, the combination of a front plate, arms between which the said front plate is pivoted, and braces I I', severally consisting of two rods or plates $i'$ $i^2$, pivotally connected together and one having a lug bearing against the edge of the other, substantially as specified.

4. In a camera, the combination of a front frame, arms between which said front frame is pivoted, one of said pivots being made in the form of a hand-screw, and braces for maintaining said arms in an upright position, consisting, severally, of two rods or plates $i'$ $i^2$, pivotally connected together, substantially as specified.

WASHINGTON IRVING ADAMS.

Witnesses:
 H. LITTLEJOHN,
 WILLARD H. FULLER.